United States Patent [19]

Mazzei et al.

[11] Patent Number: 4,827,980

[45] Date of Patent: May 9, 1989

[54] LAUNDRY FAUCET

[76] Inventors: Domonic J. Mazzei, 6 Cynthia Street, Thorold, Ontario, Canada, L2V 1W7; Rene Pilon, 38 First Avenue, La Salle, Quebec, Canada, H8P 2E5

[21] Appl. No.: 3,314

[22] Filed: Jan. 14, 1987

Related U.S. Application Data

[60] Continuation-in-part of Ser. No. 848,631, Apr. 7, 1986, abandoned, which is a division of Ser. No. 499,498, May 31, 1983, Pat. No. 4,580,600.

[51] Int. Cl.<sup>4</sup> ............................................. F16K 19/00
[52] U.S. Cl. .................................. 137/625.46; 137/597
[58] Field of Search ...................... 137/625.15, 625.46, 137/597

[56] References Cited

U.S. PATENT DOCUMENTS

| 796,249 | 8/1905 | Rohan . | |
|---|---|---|---|
| 1,136,589 | 4/1915 | Davis | 137/625.46 |
| 1,855,603 | 4/1932 | Lewis . | |
| 1,931,392 | 10/1933 | Otwell . | |
| 2,061,716 | 11/1936 | Pratt | 137/625.46 X |
| 2,120,807 | 6/1938 | Kundel . | |
| 2,889,852 | 6/1959 | Dunlap | 137/625.46 X |
| 3,134,395 | 5/1964 | Glasgow . | |
| 3,258,920 | 7/1966 | Hott | 137/625.46 |
| 4,065,982 | 1/1978 | Wenger | 137/625.46 X |
| 4,355,659 | 10/1982 | Kelchner . | |
| 4,371,003 | 2/1983 | Goguen | 137/625.46 |

FOREIGN PATENT DOCUMENTS

| 1025747 | 2/1978 | Canada . |
| 1047363 | 1/1979 | Canada . |
| 1127043 | 7/1982 | Canada . |
| 476386 | 12/1952 | Italy . |

Primary Examiner—Robert G. Nilson
Attorney, Agent, or Firm—Fleit, Jacobson, Cohn & Price

[57] ABSTRACT

A faucet assembly for controlling supply of water to either a washing machine or a laundry tub comprises a pair of inlet each of which is selectably connectable to one of two outlets. A valve member is associated with each of said inlets, and is movable from a first position in which said respective inlet is connected to one of said outlets to a second position in which said inlet is connected to the other of said outlets. The valve member is moveable to a third position in which flow to both said outlets is prevented.

6 Claims, 8 Drawing Sheets

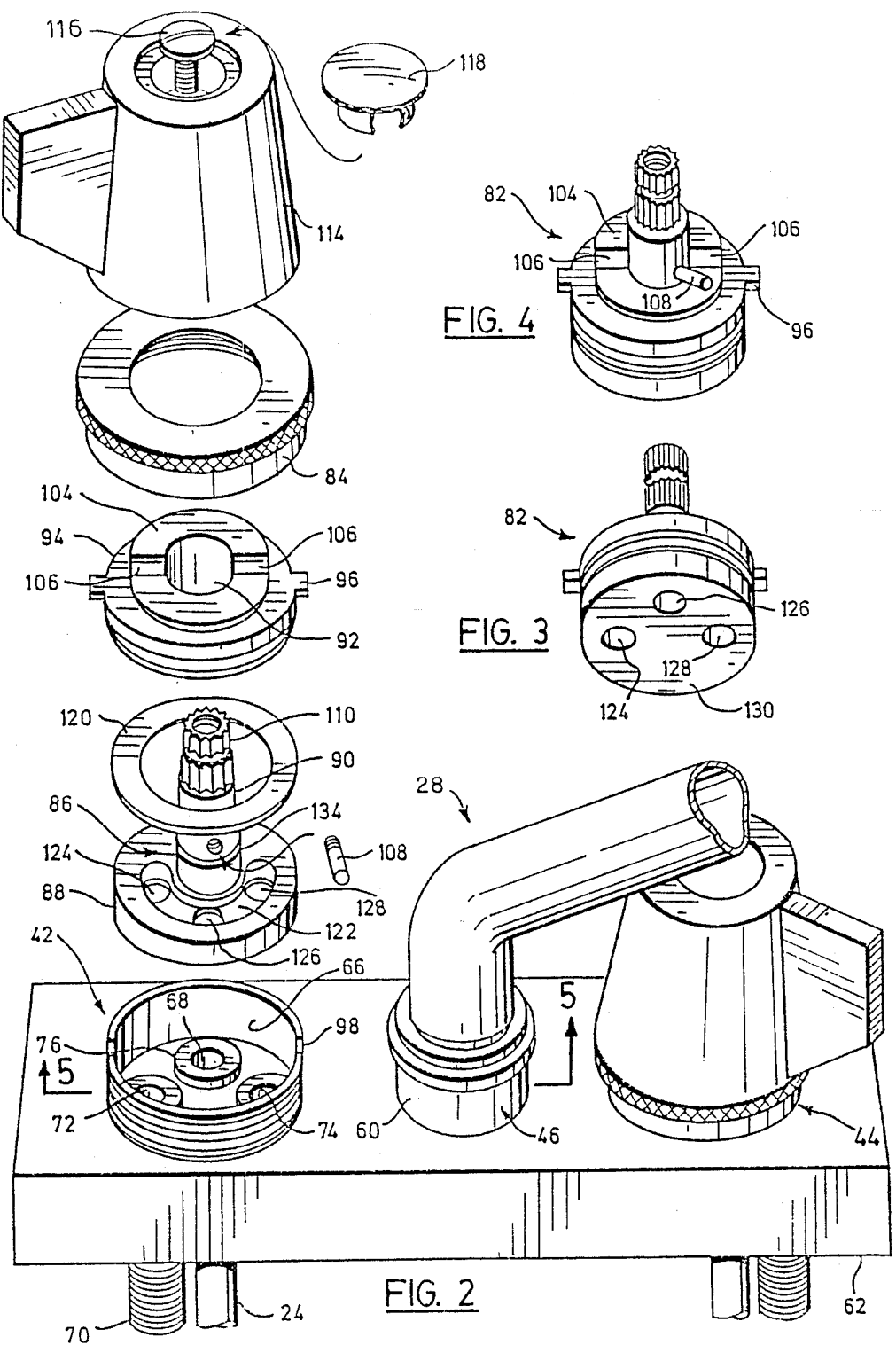

4,827,980

LAUNDRY FAUCET

This is a continuation-in-part application of application Ser. No. 848,631, filed Apr. 7, 1986, now abandoned, which is a divisional of application Ser. No. 499,498, filed May 31, 1983, now U.S. Pat. No. 4,580,600.

The present invention relates to faucet assemblies and in particular to faucet assemblies that may be used in conjunction with washing machines for controlling flow from a domestic supply to a washing machine.

It is common practice to install a washing machine adjacent a laundry tub. The washing machine and laundry tub are each supplied with hot and cold water and the supply of water to the laundry tub is controlled by a faucet mounted on the tub. The water supply for the washing machine faucet is taken from the tub supply conduit to the tub through a T piece and a separate faucet is mounted in each of the machines supply lines.

This arrangement whilst functioning satisfactorily in theory tends to be cumbersome and expensive in practice. The installation requires the use of Tee fittings in the main conduit and separate faucets to control supply to both the machine and to the tub. The faucets in the line to the machine are required to prevent flooding of the machine in the event that the check valves in the washing machine fail but are infrequently used due to their cumbersome operating mechanism and isolated location. Moreover the conventional installation is visually unattractive because of the use of multiple components which need to be located in a position to which access may be gained. Whilst these disadvantages exist, the known arrangements, are nevertheless standard throughout the construction industry.

It is therefore an object of the present invention to provide a faucet assembly on which the above disadvantages are obviated or mitigated.

According therefore to the present invention there is provided a faucet assembly comprising a pair of inlets each of which is selectively connectable to one of two outlets and a valve member associated with each of said inlets, each of said valve members being movable from a first position in which flow of said respective inlet is connected to one of said outlets to a second position in which said inlet is connected to the other of said outlets.

By using the faucet assembly described above it is possible to have a single assembly mounted on the laundry tub in a conventional manner that may be used to direct water to either the machine or the tub. Preferably the movement from the two alternative positions is achieved by simple rotation of the valve member so that disconnection of the machine is convenient to achieve.

It is also preferred that a third position be provided for the valve member to prevent flow to both of the outlets so that both the tub and the machine can be disconnected at the same time.

In another one of its aspects, the invention provides a valve assembly for a faucet, said valve assembly comprising:
 a body with a valve plate rotatable therein about an axis;
 an inlet and a pair of outlets in said valve body on one side of said valve plate and displaced from said axis, said valve plate having a sealing surface in sealing engagement with said inlet and said outlets and having a passage therein, wherein said valve plate is movable to positions selected from a position wherein said passage is in register with said inlet and only one of said outlets to permit flow from said inlet to said one of said outlets and from a position wherein said passage is out of register with said inlet to inhibit flow from said inlet to said outlet; and
 stop means to inhibit rotation of said valve plate, wherein said stop means inhibit rotation of said valve plate to a position wherein said passage is in register with said inlet and both of said outlets.

This valve assembly allows flow to a selected one of the outlets or prevents flow to either outlet, but substantially prevents flow to both outlets simultaneously.

Embodiments of the invention will now be described by way of example only with reference to the accompanying drawings in which, FIG. 1 is a schemmatic illustration of the installation of a machine and laundry tub.

FIG. 2 is an exploded perspective view of a faucet assembly showing the various components used in that assembly, FIG. 3 is a perspective view showing the underside of the assembled valve member as used in the faucet of FIG. 2, FIG. 4 is a view similar to FIG. 3 showing the top perspective view of the assembled valve member, FIG. 5 is a sectional view of one half of the assembled faucet taken along the line 5—5 of FIG. 2, FIGS. 6A-6D are a diagrammatic representation of the alternative positions of the valve member in the faucet of FIG. 2;

Figure 1:
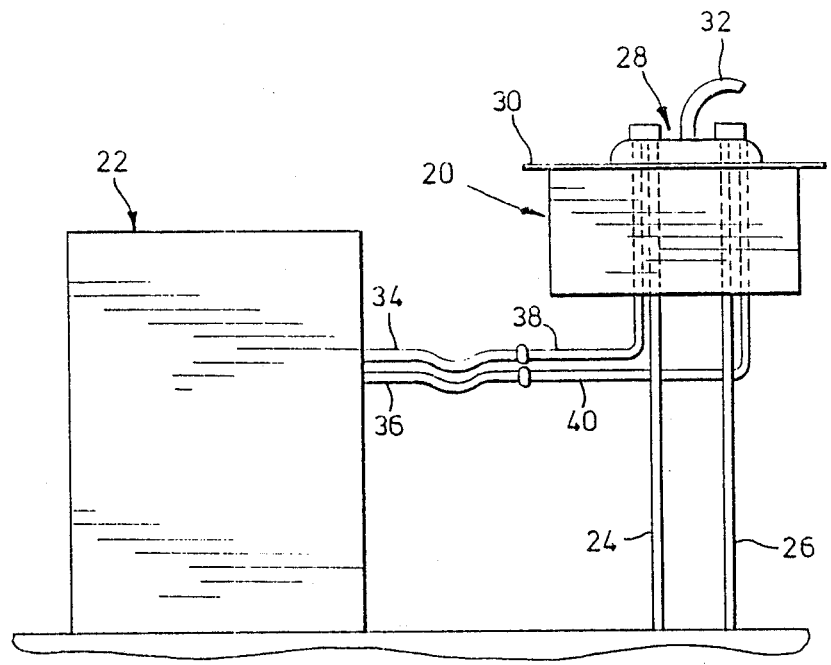

Referring now to the drawings and in particular to FIG. 1, a domestic laundry installation includes a laundry tub 20 and a washing machine 22. Water is supplied to the laundry installation through hot and cold conduits 24-26 respectively located beneath the tub 20 and connected to a faucet assembly 28. The faucet assembly 28 is mounted on the rim 30 of the tub 20 in a conventional manner and supplies water to the tub 20 through a spout 32. The washing machine 22 has a pair of flexible inlet conduits 34-36 respectively that are connected by means of conduits 38-40 through the faucet assembly 28 to the hot and cold water pipes 24-26.

The details of the faucet assembly 28 may best be seen from FIGS. 2 through 5. The faucet assembly 28 comprises a pair of valve housings 42-44 located on opposite sides of a central chamber 46 and rigidly connected thereto by means of tubes 48-50. The chamber 46 has an internal cavity 52 communicating through lateral bores 54 with the interior of the tubes 48-50 and counterbored to receive the lower end of the spout 32.

A check valve 64 is also located within the chamber 46 to seal one of the tubes 48-50 in the event that water is supplied through only one of those tubes.

The spout 32 is sealed within the cavity 52 by means of an O-ring 56 and retaining ring 58 and is retained in the chamber by means of a cap 60 that engages the retaining ring 58 and the threaded exterior of the chamber 56. The spout may therefore swing relative to the tub in the usual way. The cap 60 also serves to retain a skirt 62 that extends around the valve housings 42-44 and down to the rim 30 of the tub 20 to conceal the housings and chamber 46.

Each of the valve housings and the components associated therewith are identical and only one will therefore be discussed in detail. As may best be seen in FIG. 5, each valve housing 42-44 is counterbored to provide an internal cavity 66. The supply conduit 24 communicates with the cavity 66 through a bore 68. An outlet tube 70 is provided for connection to one of the conduits 38-40 and communicates with the cavity 66 through a bore 72. An internal passageway 74 is provided to connect the interior of the tube 50 to the cavity 66. A resilient seal member 76 comprising a spring 78 and a neoprene seal 80 is located in each of the bores 68-70 and passageway 74 within the cavity 66.

A valve assembly generally designated 82 is located within the cavity 66 and retained by means of a threaded cap 84. The valve assembly 82 includes a valve member 86 having a valve plate 88 and an upstanding stem 90. The stem 90 is rotatably received within a bore 92 extending through a valve body 94 that is provided with a pair of lateral tangs 96. An O-ring 134 seals between the stem 90 and bore 92 and the tangs 96 are received in corresponding recesses 98 in the valve housing 42 to prevent rotation of the body 94 relative to the housing 42. An O-ring 100 seals between the valve body 94 and the wall of the cavity 66 and a radially extending lip 102 of the cap 84 retains the valve body in the housing 42. A semi-circular formation 104 having a pair of vertical abutment surfaces 106 is formed on the upper surface of the valve body 94 around the bore 92 to co-operate with a pin 108 received in the stem 90 and limit rotation of the stem relative to the valve body.

The upper end of stem 90 is splined as shown at 110 to receive an internally splined boss 112 formed on the interior of a handle 114. The handle 114 is secured to the stem 90 by a screw 116 that is concealed by a cover plate 118.

The undersurface of the valve body 94 and upper surface of the valve plate 88 lie adjacent one another and are separated by means of an annular friction reducing ring 120. A semi-circular recess 122 is provided in the upper surface of the plate 88 and has three ports 124, 126 and 28 respectively spaced apart along the length of the recess. Each of the ports 124, 126 and 128 extends through the plate 88 to its undersurface 130. The undersurface 130 is planar and rests in sealing relationship with each of the seal members 76. The undersurface of the valve body 94 is formed with an annular recess 132 overlying the semi-circular recess 122 to enlarge the passageway provided by the recess 122 between the ports 124, 126, 128.

The valve member 86 may be moved relative to the valve body to one of three positions as shown in FIG. 6. In the first of these positions as shown in FIG. 6A the valve member is positioned so that the sealing surface 130 of the valve plate 88 overlies the bore 68 with pin 90 located intermediate the abutment surfaces 106 so that the valve member may be rotated in either direction. In this position the semi-circular recess 122 extends between the bore 72 and the passageway 74. But because the bore 68 is sealed by the surface 130 water is not able to flow from the inlet 34 to either of the outlet tubes 70 or the internal passageway 74. Thus both the tub and the machine 20-22 are effectively isolated.

Figure 6A:
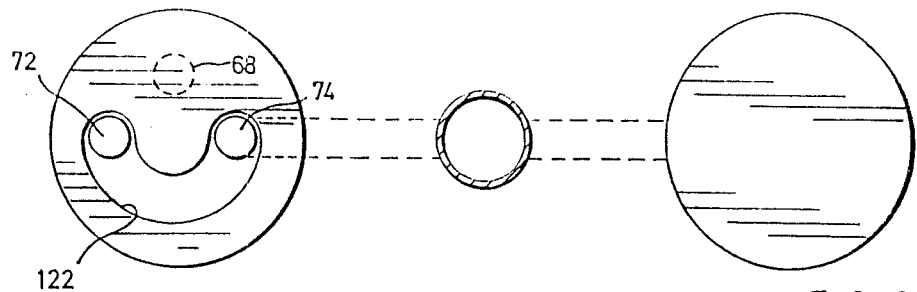
Figure 6B:
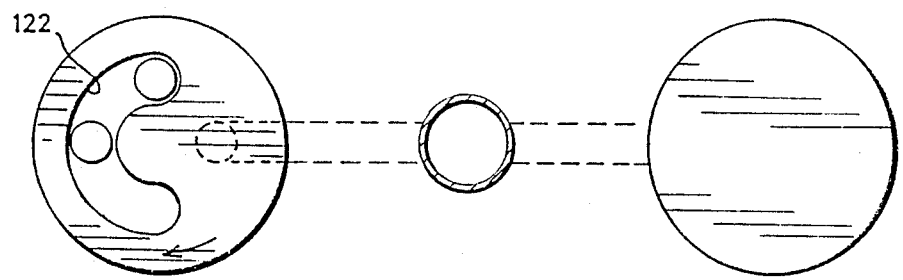

Upon rotation of the valve member clockwise as viewed from above the valve plate and valve body are moved into the relationship shown in FIG. 6B. In this position, the port 124 is in register with the bore 68 and the port 126 is in register with the bore 72. Fluid is thus able to flow from the inlet 34 to the outlet tube 70 and into the washing machine 22. The sealing surface 130 overlaps the internal passageway 74 to prevent water flowing to the tub.

Figure 6C:
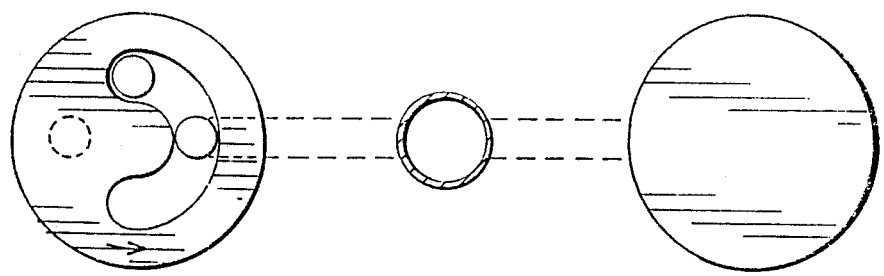
Figure 6D:
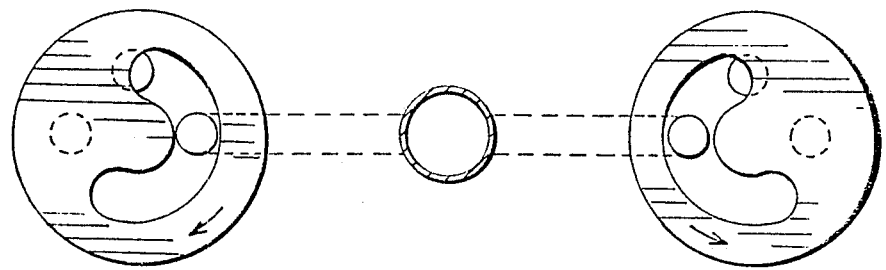
Figure 8:
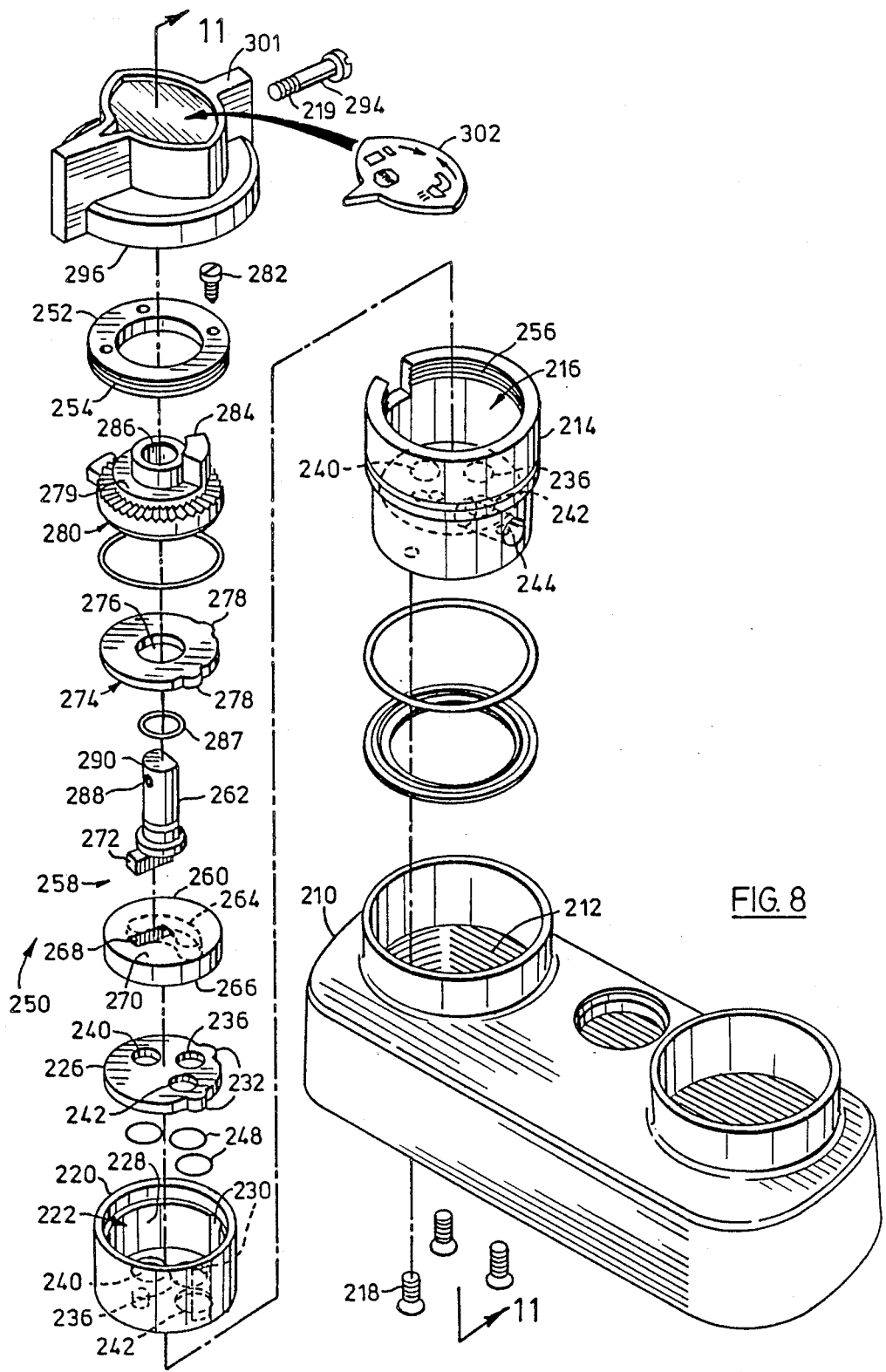
FIG. 8 is an exploded perspective view of an alternative embodiment of a valve assembly showing the various components used in that assembly.

Upon rotation of the valve member anticlockwise the plate is brought into the position of FIG. 6C. In this position, the bore 68 is in register with the port 128 and the internal passageway 74 is in register with the port 126. The bore 72 is sealed by the sealing face 130 so that water flows from the inlet 34 through the passageway 74 and tube 50 to the spout 32. Thus water may be supplied to the tub 20. The flow of water to either of the outlets may be metered by varying the register between the port 124-128 and the bore 68 in the manner shown in FIG. 6D. It will also be appreciated, as illustrated in FIG. 6D that each of the valve assemblies is independently moveable to provide any combination of water supply to the machine or tub.

It will be observed that the bores 68-72 and internal passage 74 are offset from the axis of rotation of the valve member 86 to permit the inlet 34 and the outlet tube 70 to be accommodated within a standard opening and in the rim of a laundry tub. It will also be observed that by virtue of the arrangement of the valve member it is not necessary to provide separate components to control the flow to the machine or to provide T members in the supply line.

Figure 7:
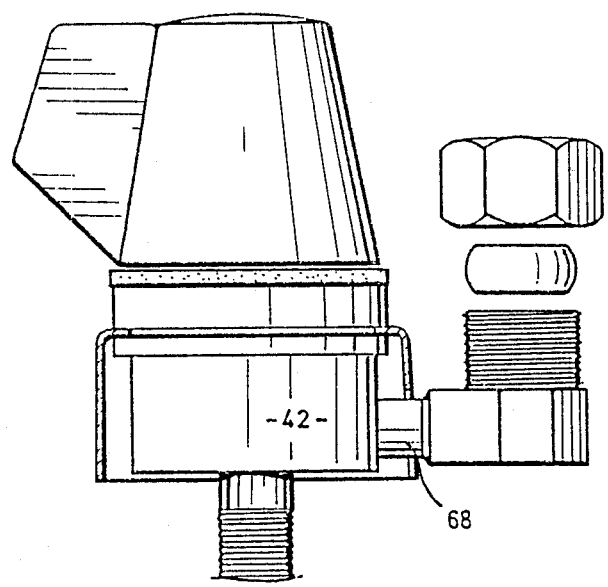
FIG. 7 is an end view of an alternative embodiment of the faucet of FIG. 2 showing an alternative type of connection.
Figure 5:
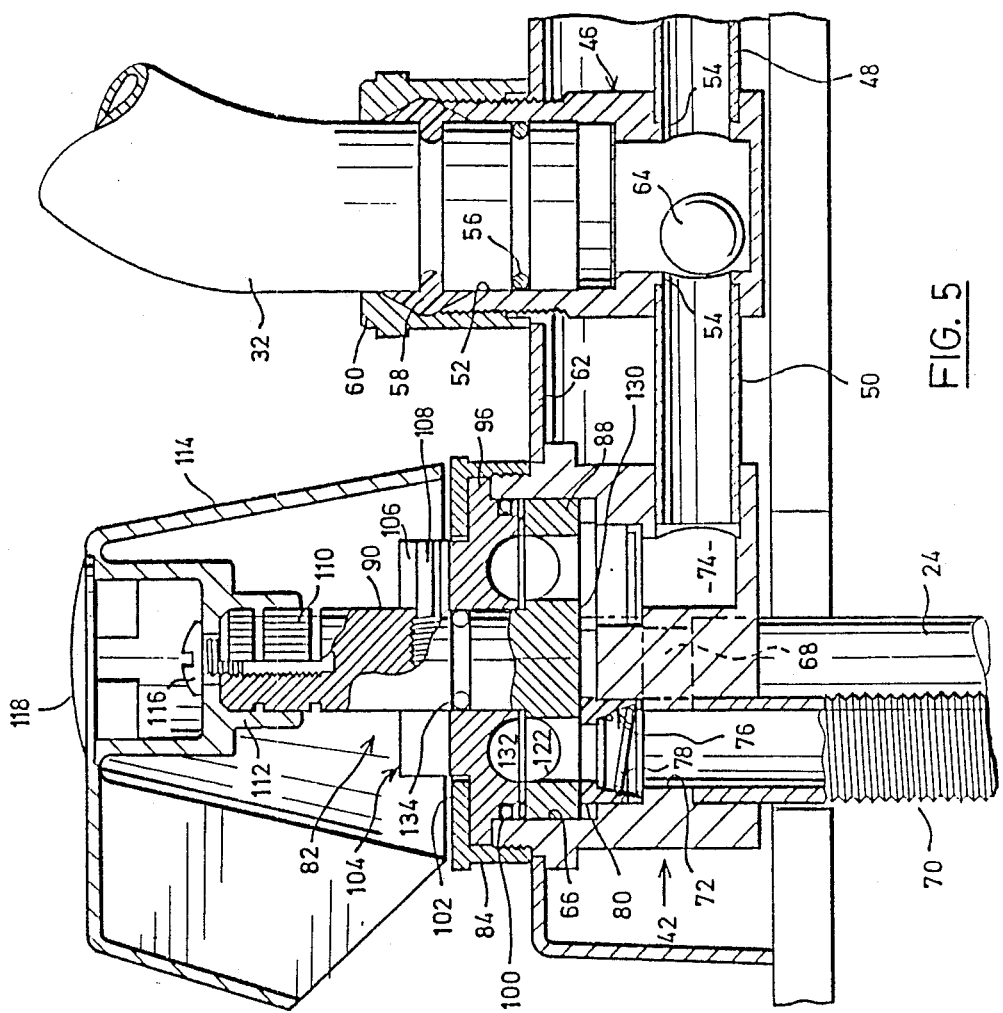

An alternative arrangement of connection is shown in FIG. 7 to permit supply of water from above the tub as is common in basement installations. In this arrangement, the bore 68 is arranged to pass through the peripheral wall of the housing 42 so that an elbow may be connected at the rear of the housing to allow connection to a vertical pipe.

The details of an alternative preferred embodiment of the valve assembly can be seen in FIGS. 8 to 12.

The valve housings 210 and the components associated therewith are identical and only the hot water valve housing 210 therefore will be discussed in detail. The valve housing 210 has a internal cavity 212 which receives a cylindrical case 214 counterbored to provide a second internal cavity 216. This case 214 is fastened to the valve housing 210 by a screw 218. A cell 220, which is also counterbored to provide a third internal cavity 222 is received in the second internal cavity 216. Located in the base of the third internal cavity 222 is a lower ceramic disk 226. The internal walls 228 of the cell 220 have a pair of arcuate indentations 230 which receive complementary-shaped projecting portions 232 of the ceramic disk 226 to inhibit movement of the disk.

Supply conduit 234 communicates with the third internal cavity 222 through aligned bores 236 in the case 214, cell 220 and disk 226. An outlet tube 238 is provided for connection to the pipe 34 leading to the washing machine 22 and communicates with the third internal cavity 222 through aligned washing machine bores 240 in the case, cell and disk. Aligned laundry tub bores 242 in the disk 226 and cell 220 are connected to an internal passageway 244 provided in the case 214 for connection to an outlet tube 246 leading to the faucet 28. Resilient seal members 248 are located in respective ones of the bores 236, 240, 242 in the disk 226.

A valve assembly, generally designated 250 is located within the cavity 222 and retained by means of a lock ring 252. This lock ring 252 is threaded on its periphery 254 and is screwed into a tapped upper portion 256 of the case.

Figure 9A:
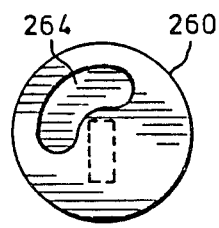
FIG. 9A is a bottom view of a valve member of figure 8.
Figure 9B:
FIG. 9B is a sectional view of the valve member taken along line B—B of FIG. 8.
Figure 9C:
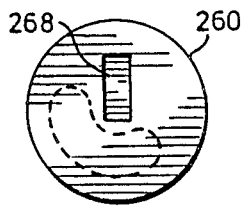
FIG. 9C is a top view of a valve member of FIG. 8.

The valve assembly 250 includes a valve member 258 having a valve plate 260 and a valve stem 262. As can be seen in FIGS. 9A, 9B and 9C, the valve plate 260 has a arcuate recess 264 in the undersurface 266 thereof and a rectangular recess 268 in the upper surface 270 thereof. The valve stem 262 has an offset lower rectangular portion 272 which is received in the rectangular recess 268.

Figure 10:
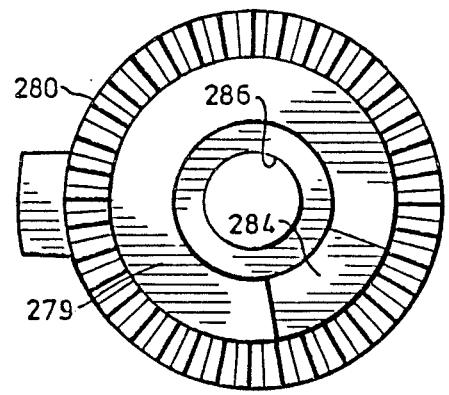
FIG. 10 is a top view of a stem guide of FIG. 8.

Located above the valve plate 260 is an upper ceramic disk 274 having an opening 276 in the centre thereof to accommodate the valve stem 262 and having a pair of projecting portions 278 on the periphery thereof which are received in the arcuate indentations 230 of the cell walls 228 to inhibit rotation thereof. Above this upper disk 274 is located a stem guide 280 which is fastened to the lock ring 252 by lock screws 282 to inhibit rotation thereof. Located on the upper surface 279 of this stem guide 280, as can best be seen in FIG. 10, is a stop 284. This stem guide 280 also has a central bore 286 through which the stem 262 extends. A sealing gasket 287 is located in this bore 286. The stem 262 nas a horizontal tapped bore 288 extending therethrough at its upper end 290 to receive the threaded end 292 of a set screw 294. This screw 294 fastens the stem 262 to a handle 296.

Figure 11:
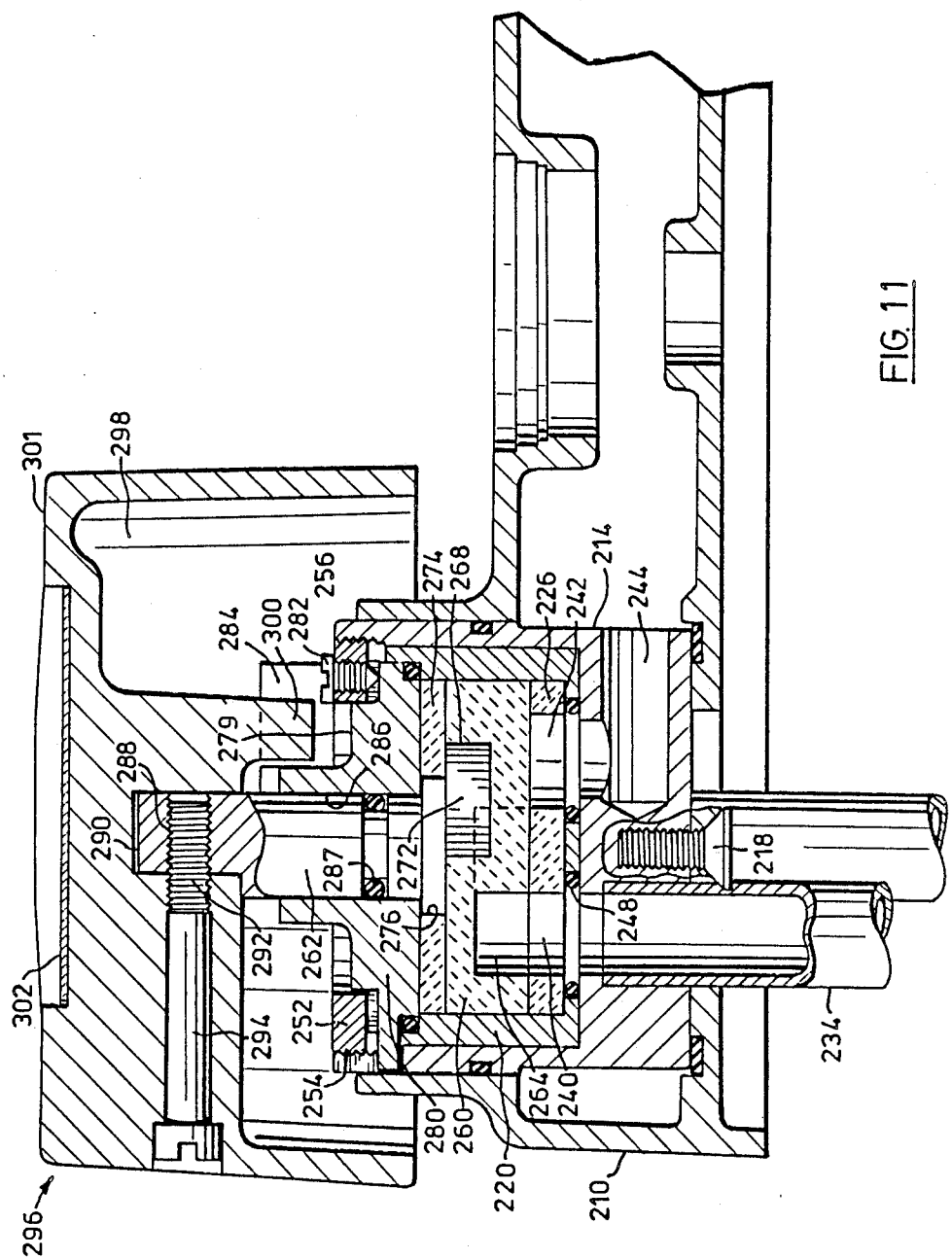
FIG. 11 is a sectional view of the assembled valve assembly of FIG. 8, taken along the line 10—10 of FIG. 8.

As can be seen in FIG. 11, the handle has a lower cavity 298 to receive the valve assembly 250 and has a handle projection 300 extending into the cavity 298 in line with the stop 284. This projection 300 is engageable with the stop 284 to inhibit rotation of the handle 296 beyond certain limits. On the upper surface 301 of the handle 296 is an index plate 302 which has indicia thereon illustrating the positions to rotate the handle 296 to direct flow either to the laundry tub 20 or to the washing machine 22, or to shut off the flow.

The operation of the valve assembly 250 is illustrated in FIG. 12. Each valve assembly 250 is movable to three positions. Referring to the hot water side 304, in the first of these positions shown in FIG. 12A, the valve plate 260 is positioned so the arcuate recess 264 overlies the washing machine outlet bore 240. In this position, the washing machine outlet is isolated from the inlet and the laundry tub outlet bore. If the cold water side 306 valve assembly 250 is positioned so that the recess 264 in the valve plate 260 overlies both the inlet bore 236 and the laundry tub outlet bore 242 as shown on the hot side 306 of FIG. 12A, the possibility of cross-flow of water from the cold side laundry tub outlet tube 246 to the hot side washing machine outlet tube 238 is avoided. It will be appreciated as illustrated in FIG. 12A, that each of the valve assemblies is independently movable to provide any combination of water supply to the machine or tap.

Figure 12A:
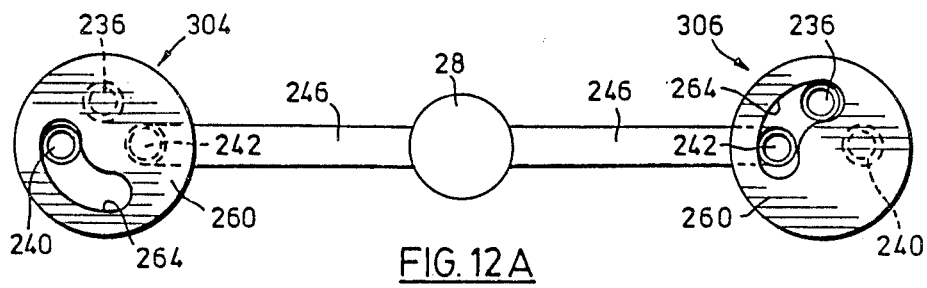
FIGS. 12A-12D are a diagrammatic representation of the alternative positions of the valve member of FIG. 8.
Figure 12B:
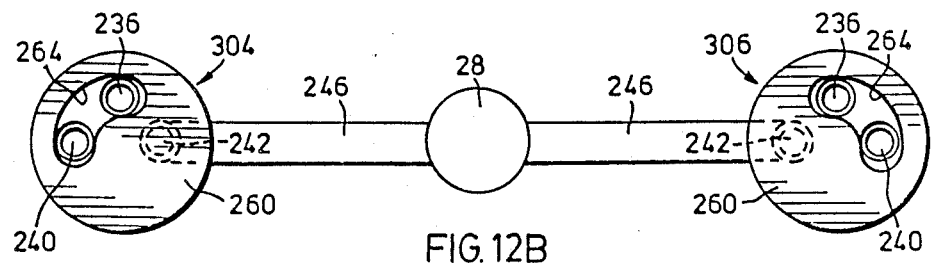

Referring again to the hot side, upon rotation of the valve plate 260 about 90° clockwise as viewed from above, the valve plate 260 is moved into the relationship with the outlet bores and inlet bore shown in FIG. 12B. In this position, the recess 264 overlies both the inlet bore 236 and the washing machine outlet bore 240, so that flow of water from the inlet bore 236 to the washing machine outlet bore 240 occurs. On the cold side 306, the valve plate 260 is moved counter-clockwise 270° so that the recess 264 overlies the inlet bore 236 and the washing machine outlet bore 240. In the position shown in FIG. 12B, the valve plate on the hot side 304 is prevented from moving further clockwise and the valve plate on the cold side 306 is prevented from moving further counter-clockwise as the respective stops 284 are engaged with the handle projections 300.

Figure 12C:
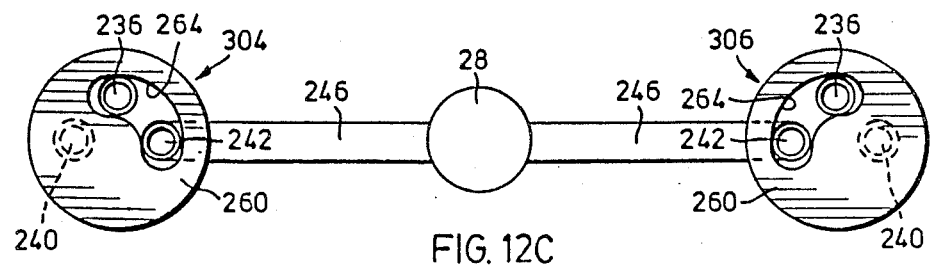
Figure 12D:
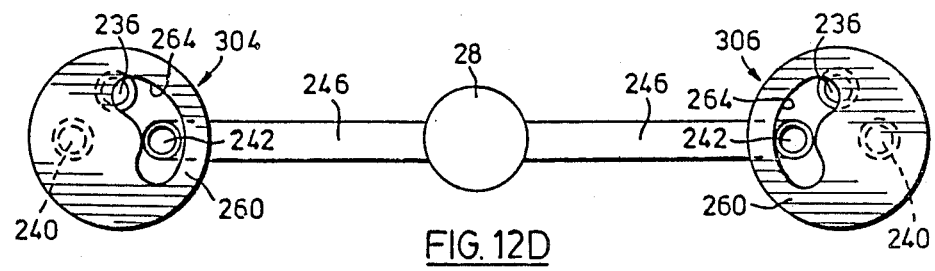

Referring again to the hot side 304, upon rotation of the valve plate 260 270° counterclockwise, the valve plate 260 is brought into the position of FIG. 12C. In this position, the recess 264 overlies both the inlet bore 236 and the laundry tub outlet bore 242. Water is then allowed to flow from the inlet bore 236 through the recess 264 to the laundry tub outlet bore, through the outlet tube 246 to the laundry tub faucet 28. As can be seen on the cold side 306 of FIG. 12C, the valve plate 260 on the cold side must be rotated 270° clockwise to attain the position where the recess 264 overlies both the inlet bore 236 and the laundry tub outlet bore 242. In the position shown on FIG. 12C, the valve plate for the hot side is restrained from moving further in the counter-clockwise direction with respect to the cold side and in the clockwise direction with respect to the hot side as the respective stops 284 engage the respective projections 300. The flow of water to either of the outlets may be metered by varying the register between the inlet bore and the outlet bores in the manner shown in FIG. 12D.

This embodiment has the advantages of requiring less machining and of having fewer locations wherein leakage can occur. Also, a check valve is not required for this embodiment. Moreover, in this embodiment, the outlet port in both faucets is always opened first and then the inlet port. This reduces the pressure exerted on the washing machine outlet hoses on both the hot and cold sides.

Whilst the invention has been described with reference to a washing machine application it will be appreciated that it may be used in other applications where service is required to one of two outlets. For example, the unit could be used in a bathroom to control flow to either a tub or a shower nozzle and in this situation may be either wall or deck mounted. The ability of the valve to regulate flow from each inlet is of course beneficial in obtaining the desired temperature of water.

We claim:

1. A valve assembly for a faucet, said valve assembly comprising:

a body with a valve plate rotatable therein about an axis;

an inlet and a pair of outlets in said valve body on one side of said valve plate and displaced from said axis, the valve plate having a surface constituting sealing means for sealingly engaging said inlet and said outlets and having a passage therein, wherein said valve plate is movable to positions selected from a first position wherein said passage is in register with said inlet and only one of said outlets while the other of said outlets is sealed by said surface sealing means to permit flow from said inlet to said one of said outlets, and a second position wherein said passage is in register exclusively with one of said outlets while said other outlet and said inlet are simultaneously sealed by said surface sealing means; and stop means for inhibiting rotation of said valve plate to a position wherein said passage is in register with said inlet and both of said outlets.

2. A valve assembly according to claim 1 wherein said inlet is located intermediate said outlets.

3. A valve assembly according to claim 2 wherein said inlet and said outlets are located equidistant from said axis.

4. A valve assembly according to claim 1 wherein said passage comprises a recess in said sealing surface.

5. A valve assembly according to claim 4 wherein said inlet is located intermediate said outlets and said outlets are equidistantly spaced from said inlet and wherein said passage is arcuate and dimensioned so as to be extendable between said inlet and one of said outlets.

6. The valve assembly of claim 1 wherein said passageway comprises three ports extending from said sealing surface to the opposite surface of said plate and a recess on the opposite side of said valve plate to connect said ports.

* * * * *